July 16, 1968  R. M. HILL  3,392,619
SOUND ATTENUATOR DEVICE FOR A WIND INSTRUMENT
Filed Aug. 10, 1965  2 Sheets-Sheet 1
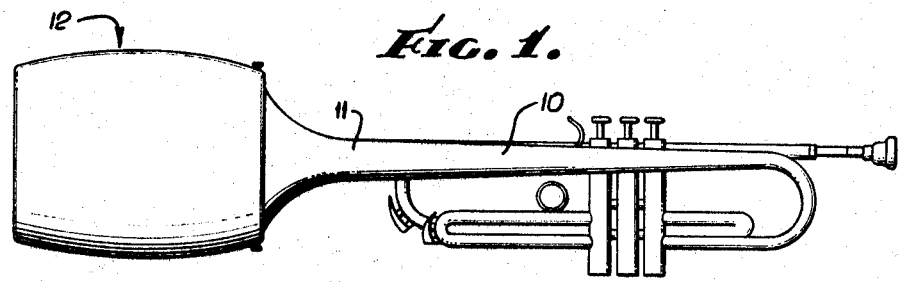
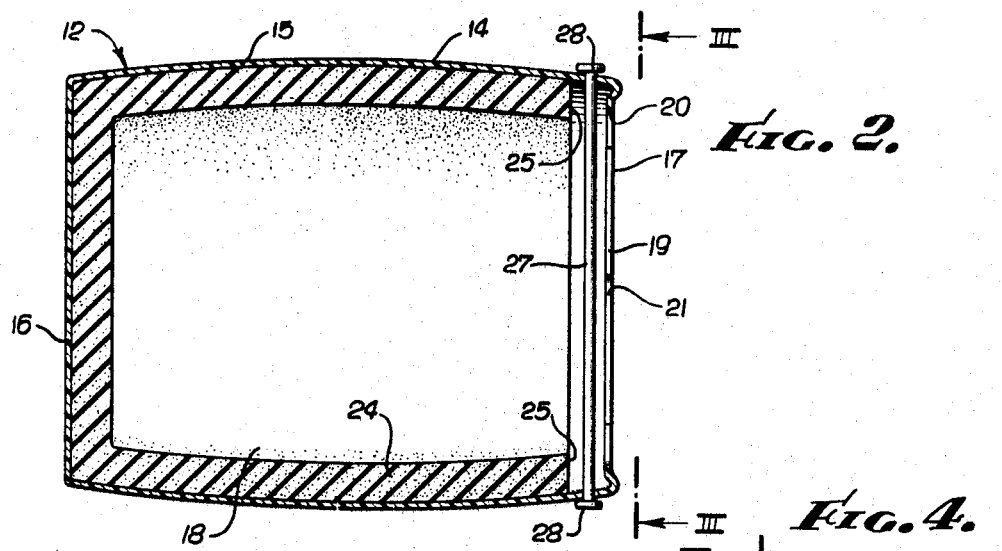
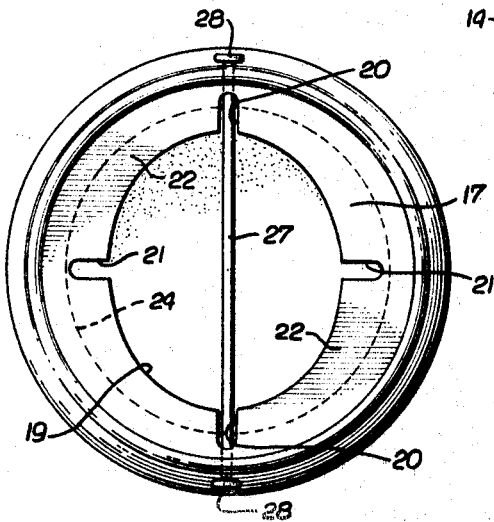
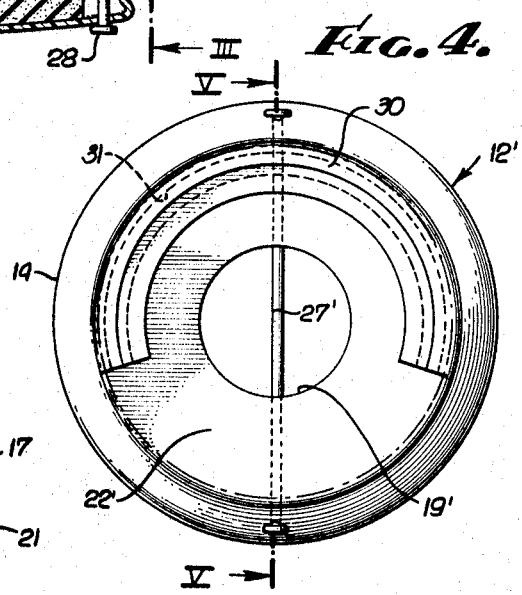
INVENTOR.
ROBERT M. HILL
BY
Miketta, Glenny, Poms & Smith
ATTORNEYS.

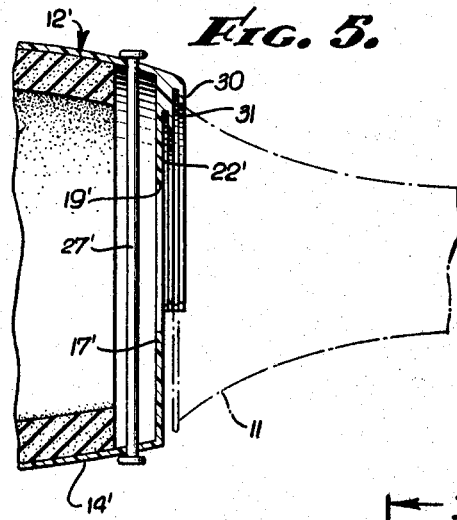
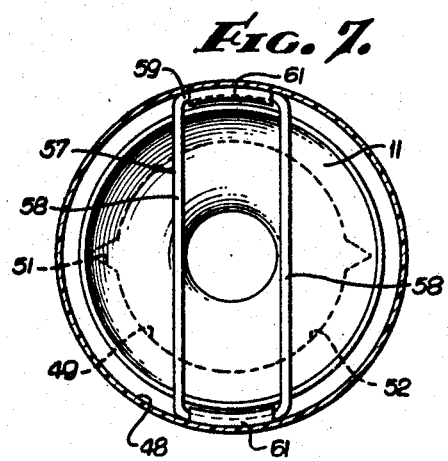
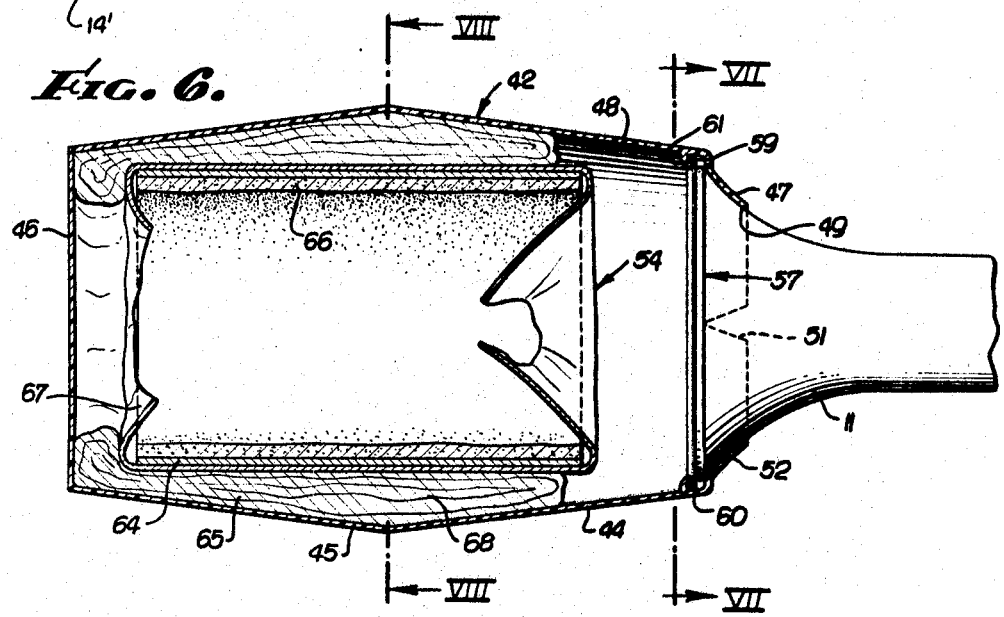
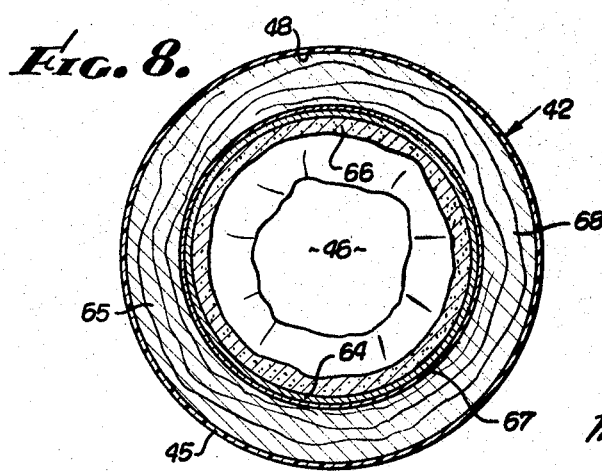

United States Patent Office 3,392,619
Patented July 16, 1968

3,392,619
SOUND ATTENUATOR DEVICE FOR
A WIND INSTRUMENT
Robert M. Hill, Montrose, Calif.
(10619 Irma Ave., Tujunga, Calif. 91042)
Filed Aug. 10, 1965, Ser. No. 478,622
13 Claims. (Cl. 84—400)

ABSTRACT OF THE DISCLOSURE

A sound attenuator device of soft plastic material providing a chamber with sound attenuating material therewithin, and one end of said receptacle having an opening and means for attaching the device to a wind instrument whereby pitch and tonal purity of sound produced by the wind instrument is maintained with the intensity level of the sound substantially reduced.

This invention relates to a sound attenuator device for a wind instrument and more particularly to an attenuator device adapted to substantially reduce sound intensity level of such an instrument while maintaining true pitch and tonal purity, thus permitting playing of the instrument, as during practice at home, without disturbing or distressing others in adjacent or nearby rooms or buildings.

Various types of mutes to soften or distort the tone of a wind instrument, such as a cornet, are well known and usually include a shape and construction which permits insertion and positioning of the mute within the bell end of a cornet. Because of distortion of tones at certain frequencies, or in only a portion of the full range of frequencies capable of being produced by the wind instrument, such prior proposed mutes were not suitable for use in practice where playing of the full range of sound frequencies may be required.

The present invention contemplates a sound attenuator device for a wind instrument wherein the intensity of sound or sound level is substantially reduced over a wide range of frequencies. Tonal distortion is minimized and the device is capable of transmitting characteristics of the instrument used and also different techniques employed by the player. Thus, in certain frequencies, as for example, high A, where some minimum distortion may occur, for example 10 to 30 cents, the player would be able to lip the note into tune or proper pitch just as a player is often required to do with certain notes in an instrument played without a sound attenuator device.

The primary object of this invention therefore is to design and provide a sound attenuator for a wind instrument and which is so constructed and arranged that sound intensity is substantially reduced in a relatively uniform manner over a wide range of frequencies.

Another object of the invention is to disclose and provide a sound attenuator device which reduces the sound level without appreciable distortion of tone and departure from true pitch.

Another object of the invention is to disclosed and provide a sound attenuator device which is of inexpensive lightweight construction and capable of extensive use and handling.

Still another object of the invention is to disclose and provide a sound attenuator device which is mounted on a wind instrument in a novel and different manner.

A still further object of the invention is to disclose and provide a sound attenuator device for a wind instrument, such as a cornet, wherein the bell end of the cornet is generally externally surrounded or encompassed by one end of the attenuator device.

The present invention contemplates several exemplary embodiments of the means for attaching the attenuator device to a wind instrument in such a manner that development of back pressure in the sound receptacle chamber will be limited.

Generally speaking, a sound attenuator device embodying this invention comprises a soft, plastic, elongated, generally cylindrical sound receptacle having a chamber closed at one end and having an opening at the other end, sound attenuating material being contained within said chamber and spaced from said opening, and means at said open end for externally attaching the receptacle on the bell end of a wind instrument so that the receptacle substantially receives all of the sound emanating from the bell end, reduces the sound intensity thereof, and then transmits the sound to atmosphere at a substantially lower decibel level.

Various other objects and advantages of the present invention will be readily apparent from the following description of the drawings in which exemplary embodiments of the present invention are shown.

In the drawings:

FIG. 1 is a side elevational view of a cornet showing a sound attenuator device embodying this invention mounted on the bell end thereof.

FIG. 2 is an enlarged sectional view of the attenuator device shown in FIG. 1, the section being taken in a vertical plane bisecting the device.

FIG. 3 is an end view of FIG. 2 taken from the plane indicated by line III—III of FIG. 2.

FIG. 4 is an end view of a modified attachment means for a device as shown in FIG. 1.

FIG. 5 is a vertical sectional view taken in the plane indicated by line V—V of FIG. 4.

FIG. 6 is a sectional view taken in a vertical plane bisecting a modification of an attenuator device embodying this invention and showing the device mounted on the end of a wind instrument.

FIG. 7 is a transverse sectional view taken in the plane indicated by line VII—VII of FIG. 6.

FIG. 8 is a transverse sectional view taken in the plane indicated by line VIII—VIII of FIG. 6.

In the drawings, an exemplary wind instrument, such as a cornet indicated at 10, includes an outwardly flared bell end 11 upon which is carried and mounted a sound attenuator device generally indicated at 12 embodying this invention.

Attenuator device 12 may comprise an elongated sound receptacle 14 of relatively soft plastic material and including a generally cylindrical, but slightly longitudinally convexly curved or ellipsoidal-shaped side wall 15 having a minimum diameter greater than the diameter of bell end 11. Receptacle 14 also includes an end wall 16 closing one end of the receptacle and a radially inwardly directed flange means 17 at the other end of the receptacle. Receptacle 14 provides a sound chamber 18 provided with an opening 19 which may be defined by flange means 17 and which may be of oval configuration for the purpose later described. Flange means 19 may be provided with one or more pairs of diametrically opposite slots 20 formed in prolongation of the major diameter of oval opening 19 and may also include slots 21 formed at prolongated ends of the minor diameter of said oval opening 19. Slots 20 and 21 are preferably diametrically opposite and it is understood may be formed in other angular relationships with respect to each other. Slots 20 and 21 define flange portions 22 which are capable of being flexed in an axial direction to facilitate mounting of the device 12 on a bell end of a wind instrument.

Receptacle 14 may be formed by any suitable molding process such as injection, rotary or spin molding end walls 15, 16 and flange 17 are integral. Since the material of receptacle 14 appears to affect the quality of the attenuated tone, a relatively soft, thermoplastic material adapted to be molded with a smooth virtually finished surface is preferred as, for example, a copolymer of polyethylene and acrylic acetate. Such a material may have a low density and a Rockwell hardness on the D scale in the order of 27–36. Such plastic material is relatively soft to the touch and flange portion 22 are readily flexible and bendable without cracking or breaking.

Within receptacle chamber chamber 18 and spaced from opening 19 is a sound attenuating or deadening material 24. In this embodiment, material 24 has a thickness substantially less than the width of flange means 17, may be of uniform thickness, and covers the internal surfaces of side wall 15 and of end wall 16 without interruption. As seen in FIG. 2, the ends 25 of material 24 are spaced inwardly from flange means 17. In this example, sound attenuating material 24 may comprise a suitable foamed rubber or plastic of either open or closed cellular construction. Shredded foam rubber loosely packed in a plastic container and felt may also be used. Other examples of sound attenuating material will be described in a succeeding embodiment of this invention.

Means for attaching and supporting the device 12 on bell end 11 comprises flange means 17 with flexible flange portions 22. Spaced slightly inwardly of flange means 17 a rigid metal pin or member 27 extends along the major diameter of the oval opening 19 and projects through suitable ports in side wall 15 for securement in receptacle 14 by external heads 28. When it is desired to mount device 12 on bell end 11 the bell end may be partially inserted into and through opening 19; approximately a semi-circular portion of bell end 11 being inserted internally of two adjacent flange portions 22 between said flange portions and member 27. The other two flange portions 22 bear against adjacent edges of bell end 11 and may not be flexed outwardly so as to externally cover a portion of bell end 11 as in the case of the first mentioned flange portions 22. Because of the flexibility and inherent resiliency of flange portions 22, it will be readily apparent that the device 12 is very quickly and simply mounted on bell end 11 and that the opposed circular end of the receptacle 14 surrounds or encompasses the edge of bell end 11. Thus, in effect, portions of the edge margins of bell end 11 are grasped and positioned by the flange portions and by the rigid member 27.

It should be noted that since opening 19 is oval shaped that bell ends of different diameters may be readily accommodated for partial or full insertion through said opening and for the aforesaid grasping and mounting by the flange portions 22. In the event the diameter of a bell end is small, the device 12 may be positioned with the minor diameter of the oval opening in a horizontal position. When the bell end is of larger diameter, the major diameter of the bell end may be positioned horizontally so that full support will be given to the device 12.

Since the diameter of the opposed end of device 12 is greater than the diameter of the bell end at its edge, it will be apparent that when the wind instrument is played the sound and pressure air emanating from the bell end of the cornet will first be entirely directed within chamber 18. Because of the sound absorbing qualities of the material 24, and the soft thermoplastic material of the walls of the receptacle the intensity level of the sound in terms of decibels will be substantially reduced. Moreover, since the adjacent flange portions 22 which do not cover the external surface of the bell end 11 extend only partially across the mouth of the bell end, it will be apparent that these flange portions may act as sound baffles. It should be noted that this exemplary mounting arrangement does not seal the end of the bell end and that there will be openings to atmosphere at the edges of the flange means 19 adjacent the internally disposed flange portions 22. Such non-sealing arrangement permits pressure air in the sound chamber 18 to escape and to reduce back pressure in the wind instrument itself.

In FIGS. 4 and 5, a modification of the attaching and supporting means for an attenuator device on a bell end 11 of a wind instrument is shown. In this example, a device 12' may comprise a hollow sound receiving receptacle 14' having an open end 19' defined by flange means 17' integrally constructed similarly to that described for device 12. Device 12' may include metal member 27' extending across opening 19'. In the present example, however, receptacle 14' is provided forwardly of flange 17' with a part circular, narrow radially inwardly directed lip 30 extending slightly more than 180° about the axis of receptacle 14' (FIG. 4). Lip 30 defines with opposed flange portions 22' a part circular channel or groove 31 adapted to receive edge portions of bell end 11. Device 12' may be readily assembled with the bell end by flexing lip 30 slightly outwardly and inserting edge portions of the bell end thereinto. It should be noted that the lower portion of the bell end may be proximate to but slightly spaced from the lower flange portions 22' of flange means 17'. In the present example flange means 17' may or may not include slots 20 and 21 and if desired opening 19' may be enlarged so that flange means 17' has a width approximately that of lip 30.

In FIGS. 6, 7 and 8, another modification of the present invention is shown. In this embodiment, a sound attenuator device 42 may comprise an integrally formed elongate sound receptacle 44 of a similar soft thermoplastic material and may include a side wall 45, an end wall 46 closing one end of the receptacle and a radially inwardly directed flange means 47 at its other end defining an opening 49 leading to sound chamber 48. Flange means 47 includes generally semi-circular flange portions 52 defined by radially extending, diametrically opposed slots 51.

In this example, a rigid metal means may comprise an elongated rectangularly formed wire member 57 providing parallel wire portions 58 extending transversely across the open end of the receptacle 44. The wire member 57 may be secured by insertion of end portions 59 within internal part peripheral grooves 60 formed by integral inwardly and forwardly extending clip portions 61.

Receptacle 44 may be readily mounted on the bell end 11 of a cornet by inserting bell end margins into opening 49 so that at least one flange portion 52 lies externally of the bell end (FIG. 6). Slots 51 may be deeply cut to provide pressure relief. The edge of bell end 11 may slightly bear against rigid wire member 57. Thus device 42 is attached and supported from bell end 11.

Within receptacle chamber 48 is positioned sound deadening means 54 which may comprise a cylindrical open-ended member 64 of suitable plastic, fibrous, or paper stock and having a diameter substantially less than the inner diameter of receptacle 44 so as to provide therebetween a generally annular space 65. Cylindrical member 64 has a length less than the length of receptacle 44 so that opposite ends of member 64 are spaced from both the closed end 46 and the flanged open end of the receptacle. Internal surfaces of cylindrical member 64 may be covered by suitable sound absorbing material, such as felt, carpet, foamed rubber or plastic, such material being indicated at 66. Around the external cylindrical surface of member 64 may be provided an elongated sheet or wrapping of plastic material 67, such as pliofilm, polyethylene, the ends of such material being gathered and loosely tucked or folded in random fashion inwardly of each open end (FIG. 6). In annular space 65, additional sound absorbing material 68 may be provided, such material comprising soft paper stock, felt sheets and the like. The paper stock may also be loosely and randomly folded and stuffed in space 65. The outer material 68 may cover only peripheral marginal portions of the internal surface of end wall 46.

As described above the several embodiments of the sound attenuator device may be conveniently and readily attached to the bell end of a wind instrument. Since the material of the attenuator device is of light weight, supporting and carrying the device on the end of an instrument is not noticeable or sufficiently heavy to cause physical strain or discomfort while the instrument is played in proper position. The different attachment means firmly position and support the device on the instrument and the proximate open end of the device virtually encompasses and surrounds the instrument bell end. Sound waves emanating from the bell end are directed within the sound chamber. The attachment means does not include a close sealing relationship with the bell end but instead the several openings at the slots in the flange means and the lower flange portions which are not positioned externally of the bell end provide openings for relief of pressure within the device and thereby limits back pressure which might be felt through the instrument by the player.

Sound waves emanating from the bell end of the instrument and directed within the sound chamber are absorbed by the sound deadening material contained within the chamber. It should be noted that the sound deadening material is spaced from the flange means so that the absorption of sound is accomplished not only by the characteristics of the sound deadening material but partially also by the relatively soft thermoplastic material used to form the sound receptacle. Surfaces of such material are not hard and are relatively soft to the touch and therefore such surfaces do not sharply reflect the sound but instead tend to soften or deaden the sound. The metal transverse member extending across the opening of the sound chamber functions not only as a part of the attachment means but also appears to affect the sound emanating from the attenuator device by preventing echos and by maintaining true tonal pitch. Tests conducted with and without the metal member have demonstrated this important acoustical effect of the metal member.

It should be also noted that the slight outward flaring of the side walls at the open end of the receptacle permit the sound waves to expand slightly and then converge at the distal end of a sound chamber. Transmittal and reflection of sound waves through the several materials employed in the attenuator device, namely: soft plastic walls, sound deadening material, and a metallic member, produces a substantially uniform reduction of sound intensity or decibel level over substantially the entire range of frequencies for which the instrument is designed to play or produce. Variations in tonal pitch have been found to be no more than that inherent in wind instruments and excellent tonal purity without variation from the true pitch of the instrument has been achieved. The sound produced is clear and pleasing to the ear and is without distortion or aberrations.

Tests of the sound attenuator device of this invention on a cornet have been made to determine the amount of reduction of sound intensity level. Such tests have included playing and holding notes at various frequencies in the range of a cornet. A note produced by a cornet without a mute or other attenuator device was played and the value in decibels of such note was indicated or referenced as 100. The same note was then played with the attenuator device on the instrument and the decibel value obtained in relation to the reference 100 was 10, thus indicated a reduction of intensity level of approximately 90%. Such exemplary reduction in sound intensity occurred with the attenuator device 12 shown in the first embodiment described above. A sound attenuator device embodying felt and foam rubber as a sound deadening material gave a decibel value reading of approximately 22–25 or a reduction of 75–78% of sound intensity. It will thus be apparent that a wind instrument such as a cornet can be played in practice sessions with a substantial reduction of sound intensity and without interference of tonal quality and pitch by using the sound attenuator device of this invention described above. Moreover, the tests have indicated that the use of the sound attenuator device does not interfere with the training of the ear and recognition of notes of true pitch and tone quality because of the ability of the sound attenuator device to uniformly reproduce over a wide range of frequencies notes of excellent tonal quality and true pitch.

It will be apparent to those skilled in the art that the sound attenuator device of this invention may be employed on other wind instruments by making the device of various sizes. It has been found that the attenuator device described above may be employed with a French horn by inserting the attenuator device in the large bell end and supporting it therein by suitable straps attached to the margins of the bell end. In such use it is desirable that the edges of the open end of the device be provided with scalloped edges or irregularly shaped edges to provide necessary pressure relief.

An additional feature of the sound attenuator device of this invention is that sound is, in effect, played back to the player in such a manner that he may regulate tone and performance to produce desired results. Such improved playback is believed to be caused by the pressure relief openings in the flange means and the reflection of sound from a smooth virtually finished surface.

It will also be apparent to those skilled in the art that various other modifications and changes may be made in the sound attenuator device described above and that all such changes and modifications coming within the scope of the appended claims are embraced thereby.

I claim:
1. A sound attenuator device for a wind instrument comprising:
   a generally cylindrical sound receptacle of relatively soft plastic material including a longitudinally convexly curved side wall,
      an end wall closing one end of the receptacle, and
      a radially inwardly directed flange means at the other end of the receptacle,
         said receptacle providing a chamber with an oval opening formed by said flange means;
   sound absorbing means contained within said chamber and spaced from said opening;
   a rigid metal member extending diametrically across said opening internally of said flange means;
   said flange means having slots extending diametrically at each end of the major and minor diameters of said oval opening and providing flange portions between said slots,
   at least two adjacent flange portions being adapted to be flexed to receive in said opening adjacent portions of a bell end of a wind instrument.

2. A device as stated in claim 1 wherein said sound absorbing means is positioned against and covers internal surfaces of said end and side walls.

3. A device as stated in claim 1 wherein said sound absorbing means includes a coaxially positioned open ended cylindrical member within said chamber,
   annular sound deadening material between said cylinder and said side wall,
   and plastic sheet material partially covering open ends of said cylindrical member and folded within said open ends of the cylindrical member.

4. A sound attenuator device for a wind instrument characterized by uniform sound intensity attenuation and minimum distortion at virtually all audible frequencies comprising:
   a sound receptacle having a chamber closed at one end and having an opening at the other end, said receptacle being made of a relatively soft plastic material;
   sound attenuating material positioned within said chamber and spaced from said opening; and
   mounting means at said other end and comprising a radially inwardly extending flange means adapted to be externally positioned on a bell end partially received within said opening, the portion of said bell end not inserted within said opening being positioned adjacent a diametrically opposite portion of said flange means.

5. A sound attenuator device for a wind instrument comprising:
- a plastic elongated sound receptacle having a chamber and an opening at one end;
- sound attenuating material within said chamber and spaced inwardly from said opening;
- and means integral with said receptacle at said one end for externally attaching said receptacle on the bell end of a wind instrument.

6. A sound attenuator device as stated in claim 5 wherein said attachment means includes radially inwardly extending flange means at said one end and defining said opening.

7. A sound attenuator device as stated in claim 5 wherein
- said attaching means includes a radially inwardly extending flange means defining an oval opening at said one end,
- said flange means having slots therein at prolongated ends of major and minor diameters of said oval opening,
- said slots defining flange portions, at least two of said flange portions being adapted to be positioned externally of the bell end of a wind instrument, said bell end being partially received within said oval opening.

8. A sound attenuator device as stated in claim 7 including a metal element extending along one of the diameters of said oval opening and positioned internally of said opening and carried by said receptacle.

9. A sound attenuator device as stated in claim 5 wherein said plastic elongated sound receptacle is made of a copolymer of polyethylene and an acrylic acetate.

10. A sound attenuator device as stated in claim 5 wherein said attaching means includes part circular longitudinally spaced flange portions providing a groove adapted to receive a portion of a bell end of a wind instrument.

11. A sound attenuator device as stated in claim 5 including a metal element extending across said opening at said one end.

12. A sound attenuator device for a wind instrument comprising:
- a generally cylindrical elongated sound receptacle of soft plastic material having a chamber and an opening at one end;
- sound attenuating material within said chamber and spaced inwardly from said opening;
- and means integral with said receptacle at said one end for attaching and supporting said receptacle at the bell end of a wind instrument.

13. A sound attenuator device as stated in claim 12 wherein said attaching and supporting means includes radially extending means at said one end.

References Cited

UNITED STATES PATENTS 2,571,809   10/1951   Altosino _____ 84—400

FOREIGN PATENTS 679,158   9/1952   Great Britain.

RICHARD B. WILKINSON, Primary Examiner.

G. M. POLUMBUS, Assistant Examiner.